US011555270B2

(12) United States Patent
Fukuoka et al.

(10) Patent No.: US 11,555,270 B2
(45) Date of Patent: Jan. 17, 2023

(54) INORGANIC PARTICLE COMPOSITE FIBER, METHOD FOR MANUFACTURING SAME, AND MOLDED ARTICLE

(71) Applicant: NIPPON PAPER INDUSTRIES CO., LTD., Tokyo (JP)

(72) Inventors: Moe Fukuoka, Tokyo (JP); Shisei Goto, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 607 days.

(21) Appl. No.: 16/606,732

(22) PCT Filed: Mar. 12, 2018

(86) PCT No.: PCT/JP2018/009495
§ 371 (c)(1),
(2) Date: Oct. 18, 2019

(87) PCT Pub. No.: WO2018/193751
PCT Pub. Date: Oct. 25, 2018

(65) Prior Publication Data
US 2020/0056325 A1 Feb. 20, 2020

(30) Foreign Application Priority Data
Apr. 21, 2017 (JP) .............................. JP2017-084823

(51) Int. Cl.
*D21H 21/20* (2006.01)
*D06M 11/76* (2006.01)
*D06M 15/19* (2006.01)
*D21H 17/42* (2006.01)
*D21H 17/43* (2006.01)
*D21H 17/56* (2006.01)
*D21H 17/67* (2006.01)
*D06M 101/06* (2006.01)

(52) U.S. Cl.
CPC ............ *D06M 11/76* (2013.01); *D06M 15/19* (2013.01); *D21H 17/42* (2013.01); *D21H 17/43* (2013.01); *D21H 17/56* (2013.01); *D21H 17/675* (2013.01); *D21H 21/20* (2013.01); *D06M 2101/06* (2013.01)

(58) Field of Classification Search
CPC .. D06M 11/79; D06M 11/46; D06M 2101/06; D06M 15/2735; D06M 11/76; D06M 11/44; D06M 11/45; D06M 11/49; D06M 15/267; D06M 15/263; D06M 15/19; D06M 23/08; D06M 15/61; D21H 17/42; D21H 17/70; D21H 21/20; D21H 17/675; D21H 17/43; D21H 17/56; D21H 17/68; D21H 17/63; C01F 5/24; C01F 11/18
USPC ........................................................ 428/392
See application file for complete search history.

(56) References Cited

U.S. PATENT DOCUMENTS

| | | | |
|---|---|---|---|
| 2009/0275906 | A1 | 11/2009 | Berland et al. |
| 2010/0331457 | A1 | 12/2010 | Buri et al. |
| 2013/0059949 | A1 | 3/2013 | Cheng et al. |
| 2015/0232647 | A1 | 8/2015 | Mun et al. |
| 2016/0010273 | A1 | 1/2016 | Ashayer-Soltani et al. |
| 2017/0107668 | A1 | 4/2017 | Fukuoka et al. |
| 2017/0113945 | A1 | 4/2017 | Fukuoka et al. |
| 2018/0282936 | A1 | 10/2018 | Fukuoka et al. |
| 2019/0047872 | A1 | 2/2019 | Fukuoka et al. |

FOREIGN PATENT DOCUMENTS

| | | |
|---|---|---|
| CN | 105484017 | 4/2016 |
| CN | 105542275 A | 5/2016 |
| EP | 2492391 A1 | 8/2012 |
| EP | 3127868 A1 | 2/2017 |
| JP | 2001/062286 | 3/2001 |
| JP | 2003/300274 | 10/2003 |
| JP | 2009-191396 | 8/2009 |
| JP | 2009/235650 | 10/2009 |
| JP | 2011-506789 | 3/2011 |
| JP | 2011-094252 | 5/2011 |
| JP | 2015-199655 | 11/2015 |
| JP | 2016-513182 | 5/2016 |
| JP | 2016/123657 | 7/2016 |
| JP | 2017-057538 | 3/2017 |
| JP | 2019/123657 A | 7/2019 |
| WO | 2007038966 | 4/2007 |
| WO | 2017/043580 | 3/2017 |
| WO | 2017/057154 | 4/2017 |
| WO | 2018109486 A1 | 6/2018 |

OTHER PUBLICATIONS

JP 2016-123657 A, Kimura Akihiro et al., Jul. 11, 2016, machine transition.*
JP 2009-235650 A, Matsushita Mitsumasa et al., Oct. 15, 2009, machine translation.*
English Translation of International Preliminary Report on Patentability (Chapter II) for PCT/JP2018/009495, dated Oct. 24, 2019.
International Search Report for PCT/JP2018/009495, dated May 29, 2018.
Extended European Search Report for 18788187.5 dated Apr. 1, 2020.
Database WPI, Week 201650, Thomson Scientific, London, GB; AN 2016-41732F, XP002798388 dated Jul. 11, 2016.

(Continued)

*Primary Examiner* — Mark Halpern

(74) *Attorney, Agent, or Firm* — Kristina Castellano; Castellano PLLC

(57) ABSTRACT

To provide a new inorganic particle composite fiber including a large amount of adhering inorganic particles, An inorganic particle composite fiber includes: fiber; and inorganic particles fixed to the fiber, the fiber being thread-like in shape, the inorganic particles being fixed to the fiber via an ionic polymer.

13 Claims, 8 Drawing Sheets

(56) References Cited

OTHER PUBLICATIONS

Database WPI, Week 200974, Thomson Scientific, London, GB; AN 2009-P75183, XP002798389 dated Oct. 15, 2009.
Extended European Search Report for application 19210396.8 dated Apr. 30, 2020.
Office Action for CN 201880026068.3 dated Aug. 18, 2021.
Office Action for EP 19210396.8 dated Jul. 1, 2021.

* cited by examiner

INORGANIC PARTICLE COMPOSITE FIBER, METHOD FOR MANUFACTURING SAME, AND MOLDED ARTICLE

CROSS REFERENCE TO RELATED APPLICATIONS

This application is a U.S. National Stage application of PCT/JP2018/009495 filed on Mar. 12, 2018, which claims priority to Japanese patent application 2017-084823 filed on Apr. 21, 2017, the contents of both of which are incorporated herein by reference.

TECHNICAL FIELD

The present invention relates to an inorganic particle composite fiber, a method for producing the inorganic particle composite fiber, and a molded article.

Background Art

Causing inorganic particles to adhere to the surface of fiber allows the fiber to exhibit various properties. There has been under development a method of synthesizing an inorganic substance in the presence of fiber to produce a composite of inorganic particles and fiber.

Patent Literature 1, for example, discloses an inorganic particle composite fiber of calcium carbonate and lyocell fiber or polyolefin fiber.

Patent Literature 2, for example, discloses a method of immersing a film formation target material alternately in a solution containing positively charged particles and a solution containing negatively charged particles a plurality of times to produce a layer-by-layer assembled film having a multilayer structure.

Patent Literature 3 discloses a method of alternately applying (i) a positively charged substance containing solution containing a positively charged substance and (ii) a negatively charged substance containing solution containing a negatively charged substance in such a manner as to form a liquid film on a surface of a film formation target material to produce a layer-by-layer assembled film.

CITATION LIST

Patent Literature

[Patent Literature 1]
Japanese Patent Application Publication, Tokukai, No. 2015-199655 (Publication date: Nov. 12, 2015)
[Patent Literature 2]
Japanese Patent Application Publication, Tokukai, No. 2001-062286 (Publication date: Mar. 13, 2001)
[Patent Literature 3]
Japanese Patent Application Publication, Tokukai, No. 2003-300274 (Publication date: Oct. 21, 2003)

SUMMARY OF INVENTION

Technical Problem

Causing more inorganic particles to adhere to fiber will allow the resulting composite fiber to have a greater function derived from the inorganic particles. A new inorganic particle composite fiber including a large amount of adhering inorganic particles is thus useful. A composite fiber, regardless of its shape, is required to have a great usable function derivable from inorganic particles. In view of that, an aspect of the present invention has an object of providing a composite fiber including a larger number of adhering inorganic particles and a method for producing the composite fiber.

Solution to Problem

The present invention encompasses, but is not limited to, the following features:
(1) An inorganic particle composite fiber, including: fiber; and inorganic particles fixed to the fiber, the fiber being thread-like in shape, the inorganic particles being fixed to the fiber via an ionic polymer.

Advantageous Effects of Invention

An aspect of the present invention advantageously provides a new inorganic particle composite fiber including a large amount of adhering inorganic particles and techniques related to the inorganic particle composite fiber.

DESCRIPTION OF EMBODIMENTS

Figure 1:
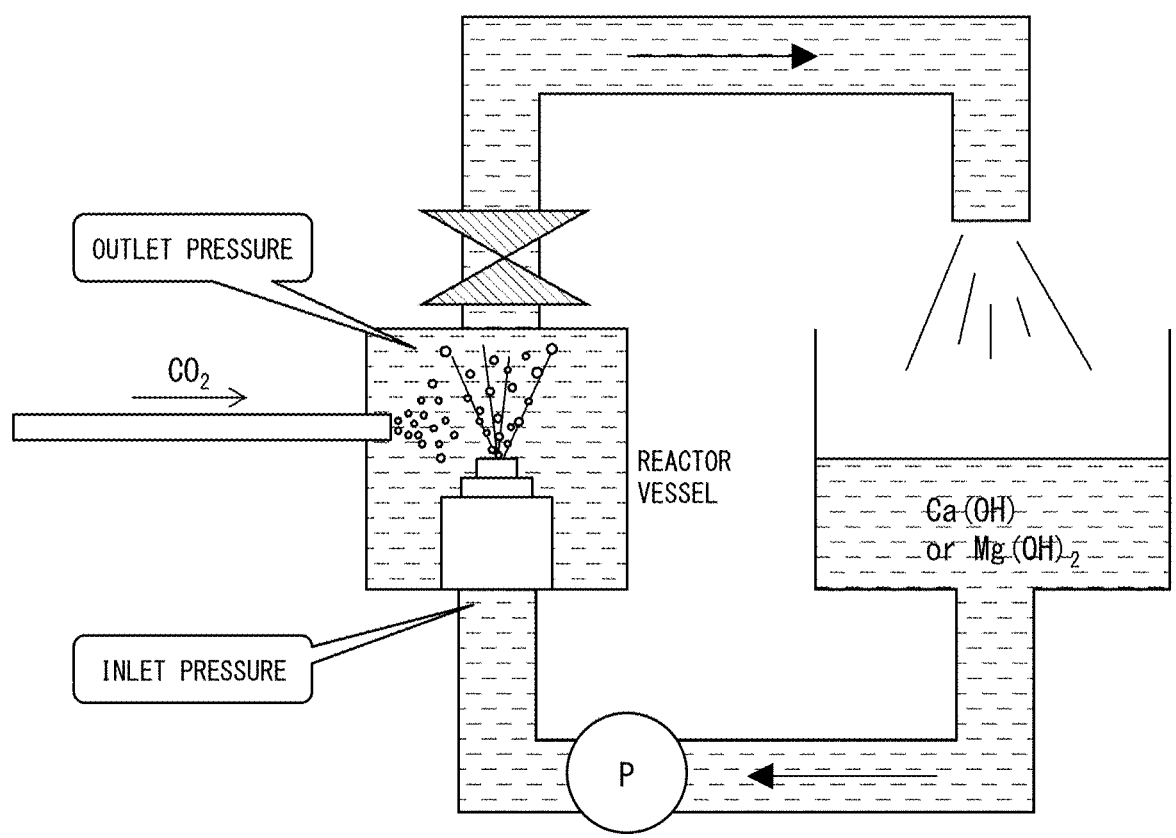
FIG. 1 is a diagram schematically illustrating a reaction device used to synthesize inorganic particles in Examples.

The present invention relates to a composite fiber including fiber and inorganic particles fixed to the fiber, the inorganic particles being fixed to the fiber via an ionic polymer. This arrangement allows production of a composite fiber including a large amount of adhering inorganic particles (that is, a composite fiber having a high ash yield). The above arrangement thus allows the inorganic particle composite fiber to more remarkably exhibit a function of the inorganic particles. The present specification may use the simple term "composite fiber" to mean an inorganic particle composite fiber.

For an aspect of the present invention, fiber is used as a base material to which inorganic particles are to be fixed. The form of the fiber is not limited to any particular one. Fiber in the form of pulp, thread, or the like allows a larger number of inorganic particles to be fixed than, for example, fiber molded into a sheet. Using fiber in the form of pulp, thread, or the like thus allows production of a composite fiber including a larger amount of adhering inorganic particles. Such a composite fiber suitably exhibits functions, for example, not only as a material for producing a molded article such as a sheet but also as a filler.

The term "pulp" as used herein refers to a fibrous material as (i) an aggregate or an assembly of fiber or (ii) a cotton-like material. The fiber is, for example, in a state where the fiber is unmolded, that is, the fiber is not molded into a desired shape such as a sheet through, for example, a paper-making process.

The present specification uses the term "thread-like" to refer to an elongate shape.

Examples of the fiber include, but are not limited to, a natural cellulose fiber, a regenerated fiber (semi-synthetic fiber) such as rayon and lyocell, and a synthetic fiber. Examples of the raw material of a cellulose fiber include wood pulp and non-wood pulp, cellulose nanofiber, bacterial cellulose, animal-derived cellulose such as ascidian, and algae. Wood pulp can be produced by converting wood feedstock into pulp. Examples of the wood feedstock include (i) coniferous trees such as Japanese red pine, Japanese black pine, Sakhalin fir, Yezo spruce, *Pinus koraiensis*, Japanese larch, Japanese fir, Southern Japanese hemlock, Japanese cedar, Hinoki cypress, Japanese larch, *Abies veitchii*, spruce, Hinoki cypress leaf, Douglas fir, hemlock, white fir, spruce, Balsam fir, cedar, pine, Merkusii pine, and Radiata pine, and admixtures thereof; and (ii) broadleaf trees such as Japanese beech, birch, Japanese alder, oak, *Machilus thunbergii, Castanopsis*, Japanese white birch, Japanese aspen, poplar, Japanese ash, Japanese poplar, eucalyptus, mangrove, lauan, and acacia, and admixtures thereof.

A method for converting the natural material such as wood feedstock (woody raw material) into pulp is not particularly limited, and, for example, a pulping method commonly used in the paper industry can be employed. Wood pulp can be classified depending on the pulping method. Examples of the wood pulp include (i) chemical pulp digested by kraft method, sulfite method, soda method, polysulfide method, or the like, (ii) mechanical pulp obtained by pulping with mechanical force provided by a refiner, a grinder, or the like, (iii) semi-chemical pulp obtained by pulping with mechanical force after pretreatment with chemicals, (iv) wastepaper pulp, and (v) deinked pulp. The wood pulp can be unbleached (i.e., before bleaching) or bleached (i.e., after bleaching). For example, a fibrous substance recovered from paper mill wastewater can be used for the present invention.

Examples of the non-wood pulp include cotton, hemp, sisal hemp, Manila hemp, flax, straw, bamboo, bagasse, kenaf, sugar cane, corn, rice straw, paper mulberry, paper bush, and the like.

Example fibers other than the above fibers include a synthetic fiber. Example synthetic fibers include a polyester, a polyamide such as nylon and aramid, a polyolefin, polyurethane fiber, acrylic fiber, vinylon, vinylidene, polyvinyl chloride, glass fiber, carbon fiber, and various metal fibers. The present invention can use a composite fiber of any of the above synthetic fibers and cellulose fiber. Example polyolefins include polyethylene and polypropylene. Examples of the polyethylene include high-density polyethylene, low-density polyethylene, very-low-density polyethylene, linear-chain low-density polyethylene, and ultra-high molecular weight polyethylene.

The fibers described above can be used alone or two or more types of the fibers can be mixed together. For example, a fibrous substance recovered from paper mill wastewater can be used as a base material.

The above fiber can be either unbeaten or beaten, and can be selected according to physical properties of the composite fiber. It is preferable that the fiber is beaten. By the beating, it is possible to expect improvement in sheet strength and promotion of fixing of inorganic particles to the pulp fibers.

According to a preferable aspect, a composite fiber for the present invention uses a semi-synthetic fiber or a synthetic fiber as a base material.

The fiber length of fiber serving as a base material is not particularly limited. The average fiber length can be approximately 0.1 μm to 15 mm. The average fiber length may alternatively be 1 μm to 12 mm, 100 μm to 10 mm, or 500 μm to 8 mm, for example.

The amount of fiber to be complexed is preferably an amount with which 15% or more of the fiber surface is covered with inorganic particles. The weight ratio between the fiber and the inorganic particles can be, for example, 5/95 to 95/5. The weight ratio may alternatively be 10/90 to 90/10, 20/80 to 80/20, 30/70 to 70/30, or 40/60 to 60/40. The weight ratio between the fiber and the inorganic particles can be determined from the ash content of the composite fiber.

According to the inorganic particle composite fiber in accordance with the present invention, 15% or more of the fiber surface is covered with inorganic particles. In a case where the fiber surface is covered at such an area ratio, a characteristic attributable to the inorganic particles can be increased. The proportion at which the fiber is covered with inorganic particles can be determined by means of microscopic observation such as electron microscopy.

An example index for determining whether a fiber surface is covered with inorganic particles is an increase in the surface area. For instance, while fiber by itself has a BET specific surface area of approximately 1 to 2, an increase in the value to not less than 3 due to compositing can be regarded as indicating that not less than a certain amount of inorganic particles is fixed to the fiber surface. Suitable examples of the method for measuring a specific surface area include, other than the BET method, Blaine method, Fischer method, and Langmuir method.

Ionic Polymer

An embodiment of the present invention involves use of an ionic polymer to serve as (i) a base for fixing inorganic particles to fiber and as (ii) a binder (binding agent) for binding inorganic particles with each other. This arrangement allows a large amount of inorganic particles to adhere to any of various kinds of base materials. In other words, the above arrangement allows a wider variety of selectable kinds of fibers.

The present specification uses expressions such as inorganic particles being "fixed" to a base to refer to a state where inorganic particles adhere to a surface of the base. The present specification uses expressions such as inorganic particles being "bound" to refer to a state where inorganic particles adhere to each other via an ionic polymer to form a single layer.

Base

A composite fiber in accordance with an aspect of the present invention includes as a base at least one layer of an ionic polymer or alternatively a plurality of layers each including an ionic polymer. The plurality of layers are an alternate stack of a cationic polymer and an anionic polymer. In a case where the base includes a plurality of layers as such, the composite fiber includes a larger amount of adhering inorganic particles due to (i) a high affinity of the cationic polymer for the fiber surface and (ii) a good fixing property of the anionic polymer for inorganic particles.

The present specification uses the term "base layer" or simply "base" to refer to (i) an ionic polymer layer directly covering a fiber surface or (ii) a plurality of layers formed of respective ionic polymers which plurality of layers include the above ionic polymer layer.

Examples of the cationic polymer include (i) modified polyethyleneimine containing a tertiary and/or quaternary ammonium group, polyethyleneimine, polyalkyleneimine, a dicyandiamide polymer, polyamine, a polyamine/epichlohydrin polymer, and polyallylamine hydrochloride, (ii) a polymer of acrylamide and a dialkyl diallyl quaternary ammonium monomer, dialkylaminoalkyl acrylate, dialkylaminoalkyl methacrylate, dialkylaminoalkyl acrylamide, and/or dialkylaminoalkyl methacrylamide, (iii) a polymer of a monoamine and epihalohydrin, (iv) a polymer having a polyvinylamine moiety and a vinylamine moiety and a mixture of these compounds, (v) cationized starch, phosphorylated starch, and cationized cellulose nanofiber, as well as a cation-rich zwitterionic polymer obtained by copolymerizing an anionic group such as a carboxyl group or sulfone group with molecules of any of the above polymers (i) to (v) as a cationic polymer and a mixture of a cationic polymer and an anionic polymer or a zwitterionic polymer. Preferable examples include polyethylene imine and diallyl dimethyl ammonium chloride. A cationic polymer is a preferable ionic polymer because, for example, a cationic polymer has a high affinity for a surface of fiber having a polar group such as a hydroxyl group.

The weight average molecular weight of the cationic polymer is not limited to any particular value as long as the cationic polymer allows inorganic particles to be fixed to fiber. The weight average molecular weight is preferably 1000 to 5000000, more preferably 10000 to 1000000. A weight average molecular weight of 10000 to 1000000 makes it possible to easily control how the cationic polymer is adsorbed on a base material. In other words, a weight average molecular weight of 10000 to 1000000 allows the cationic polymer to be suitably adsorbed on a surface of (i) fiber as a base material or (ii) a deposited film formed of the anionic polymer. Further, a cationic polymer having a weight average molecular weight within the above range can, for example, prevent the cationic polymer adsorbed on a surface of fiber from being (i) dissolved in, for example, water for use in the rinsing treatment described later and (ii) desorbed from the fiber during production of a composite fiber.

Examples of the anionic polymer include a polymer and copolymer of an unsaturated carboxylic acid, an unsaturated sulfonic acid, or the like. Examples of the unsaturated carboxylic acid include acrylic acid, methacrylic acid, maleic acid, fumaric acid, itaconic acid, citraconic acid (anhydride), and a salt thereof. Examples of the unsaturated sulfonic acid include vinyl sulfonic acid, allyl sulfonic acid, styrene sulfonic acid, sulfopropyl acrylate, 2-acrylamide-2-methylpropanesulfonic acid, and a salt thereof. These anionic polymers may each be, for example, a copolymer of (i) the unsaturated carboxylic acid, the unsaturated sulfonic acid, or the like a salt thereof mentioned above and (ii) an ester of the above unsaturated carboxylic acid, an ester of the above unsaturated sulfonic acid, an olefin such as ethylene, or a nonionic monomer such as styrene. A polymer or copolymer of the unsaturated carboxylic acid, the unsaturated sulfonic acid, and/or the like described above is an anionic polymer known as having a chelating ability. For the present invention, such an anionic polymer is preferable because the anionic polymer allows a larger amount of inorganic particles to adhere to fiber regardless of whether the inorganic particles have an electric charge opposite in polarity to the electric charge of the anionic polymer. Examples of the anionic polymer include a starch into which a carboxyl group, a sulfate group, or a sulfonate group has been introduced, an alginic acid, a cellulose such as cellulose nanofiber, and a gum. Further examples of the anionic polymer include a carboxymethyl cellulose (CMC), an alginic acid (that is, an alginic acid and a salt thereof), xanthan gum, carboxymethyl guar gum, phosphorylated guar gum, carboxymethyl starch, and starch phosphate.

The weight average molecular weight of the anionic polymer is not limited to any particular value as long as the cationic polymer allows inorganic particles to be fixed to fiber. The weight average molecular weight is preferably 1000 to 5000000, more preferably 10000 to 1000000. A weight average molecular weight of 10000 to 1000000 makes it possible to easily control how the anionic polymer is adsorbed on a base material. In other words, a weight average molecular weight of 10000 to 1000000 allows the anionic polymer to be suitably adsorbed on a surface of (i) fiber as a base material or (ii) a deposited film formed of the cationic polymer. Further, a cationic polymer having a weight average molecular weight within the above range can, for example, prevent the anionic polymer adsorbed on a surface of fiber from being (i) dissolved in, for example, water for use in the rinsing treatment described later and (ii) desorbed from the fiber during production of a composite fiber.

The ionic polymer may be an amphoteric ionic polymer. Examples of the amphoteric ionic polymer include an ionic polymer having an amino group and a carboxyl group.

The cationic polymer and the anionic polymer described above may each be suitably a chemical agent for use as, for example, a retention aid, a coagulant, a dry paper strengthening agent, or a wet paper strengthening agent typically for paper making.

Layer Including Inorganic Particles

A layer including inorganic particles is fixed to a surface of fiber via an ionic polymer as a base. The inorganic particles are bound to each other via an ionic polymer as a binder to form the layer including inorganic particles. The ionic polymer as a binder can be the same ionic polymer as that described above as an example ionic polymer for use as a base.

The kind of inorganic particles can be selected as appropriate according to the purpose. The inorganic particles are preferably insoluble or poorly soluble in water, because the inorganic particles may be synthesized in a water system for production of a composite fiber, and the composite fiber may be used in a water system.

The inorganic particles are particles of an inorganic compound and can be, for example, of a metal compound. The metal compound is so-called inorganic salt that is obtained by an ionic bond of positive ions of metal (e.g., $Na^+$, $Ca^{2+}$, $Mg^{2+}$, $Al^{3+}$, and $Ba^{2+}$) and negative ions (e.g., $O^{2-}$, $OH^-$, $CO_3^{2-}$, $PO_4^{3-}$, $SO_4^{2-}$, $NO_{3-}$, $Si_2O_3^{2-}$, $SiO_3^{2-}$, $Cl^-$, $F^-$, and $S^{2-}$). Specific examples of the inorganic particles include particles of a compound containing at least one metal selected from the group consisting of gold, silver, titanium, copper, platinum, iron, zinc, palladium, zirconium, and aluminum. The inorganic particles can also be particles of (i) calcium carbonate (light calcium carbonate, heavy calcium carbonate), magnesium carbonate, barium carbonate, aluminum hydroxide, calcium hydroxide, barium sulfate, magnesium hydroxide, zinc hydroxide, calcium phosphate, zinc oxide, zinc stearate, titanium dioxide, silica composed of sodium silicate and mineral acid (white carbon, silica/calcium carbonate complex, silica/titanium dioxide complex, and the like) and (ii) calcium sulfate, zeolite, and hydrotalcite. As the calcium carbonate-silica complex, in addition to the complexes of calcium carbonate and/or light calcium carbonate and silica, amorphous silica such as white carbon can be used in combination. The above exemplified inorganic particles can be used alone or two or more types of those inorganic particles can be used in combination, provided that those inorganic particles do not disturb synthetic reactions in the solution containing fiber.

In a case where the inorganic particles in the composite fiber are hydrotalcite, it is more preferable that the ash of composite fiber of hydrotalcite and nonpolar chemical fiber contains at least one of magnesium and zinc in an amount of not less than 10% by weight.

According to an embodiment of the present invention, the inorganic particles can contain at least one compound selected from the group consisting of calcium carbonate, magnesium carbonate, barium sulfate, and hydrotalcite.

The inorganic particle composite fiber may have a layer of an ionic polymer as an outermost layer. The outermost layer of the inorganic particle composite fiber may be a layer of a cationic polymer or a layer of an anionic polymer. The outermost layer of the inorganic particle composite fiber may be a layer of inorganic particles fixed to an ionic polymer. The inorganic particle composite fiber may include inorganic particles that are exposed on a surface depending on what function the inorganic particles are intended to achieve.

Purpose of Use

The inorganic particle composite fiber in accordance with the present invention finds various applications regardless of whether the inorganic particle composite fiber has been molded into a sheet or the like. Example applications include paper, nonwoven fabric, fibers, cellulosic composite materials, filter materials, paints, plastics and other resins, rubbers, elastomers, ceramics, glasses, tires, building materials (such as asphalts, asbestos, cement, boards, concrete, bricks, tiles, plywood, and fiber boards), various carriers (such as catalytic carriers, pharmaceutical carriers, agrochemical carriers, and microbial carriers), adsorbents (for removing impurities, deodorization, dehumidification, and the like), wrinkle inhibitors, clays, abrasives, modifiers, repairing materials, heat insulating materials, dampproof materials, water-repellent materials, waterproof materials, light shielding materials, sealants, shielding materials, insect repellents, adhesive agents, inks, cosmetics, medical materials, paste materials, discoloration inhibitor, food additives, tablet excipients, dispersing agents, shape retaining agents, water retaining agents, filtration assistants, essential oil materials, oil processing agents, oil modifiers, radiowave absorptive materials, insulators, sound insulating materials, vibration proofing materials, semiconductor sealing material, radiation-proof materials, cosmetics, fertilizers, feeds, perfumes, additives for paints and adhesive agents, flame retardant materials, hygiene products (such as disposable diapers, sanitary napkins, incontinent pads, and breast milk pads), and wet wipers (such as wet tissue). In addition, the inorganic particle composite fiber can be used in articles such as various types of filler and coating agents in the above described applications.

Method for Producing Inorganic Particle Composite Fiber

A method in accordance with an aspect of the present invention for producing an inorganic particle composite fiber includes fixing the inorganic particles to the fiber by (i) immersing fiber into a solution containing an ionic polymer or applying the fiber to the solution containing the ionic polymer; and subsequently (ii) immersing the fiber into a dispersion containing inorganic particles or applying the fiber to the dispersion containing the inorganic particles. This arrangement allows production of an inorganic particle composite fiber including a large amount of adhering inorganic particles (that is, an inorganic particle composite fiber having a high ash yield) even in a case where fiber as a base material is, for example, a synthetic fiber. The above method thus allows production of an inorganic particle composite fiber capable of more remarkably exhibiting a function of the inorganic particles.

A method in accordance with an aspect for producing an inorganic particle composite fiber includes either or both of (i) a step of forming a base for fixing inorganic particles to fiber and (ii) a step of forming a layer including inorganic particles by layer-by-layer method. An aspect preferably includes a step of surface-treating fiber as a base material before forming a layer including an ionic polymer by layer-by-layer method.

Surface Treatment

A method in accordance with an aspect for producing a composite fiber preferably includes a step of surface-treating fiber as a base material to modify the surface of the fiber before (i) immersing the fiber into a solution containing an ionic polymer or (ii) applying the fiber to the solution. Example methods of the surface treatment include UV-ozone treatment, frame surface treatment, plasma discharge treatment, glow discharge treatment, corona discharge treatment, hydrolysis treatment involving an alkali, acid treatment, silane coupling agent treatment, and primer treatment. The surface treatment can be carried out, for example, by oxidation of fiber as a base material in water with an oxidizer in the presence of (i) an N-oxyl compound and (ii) a compound selected from the group consisting of bromide, iodide and a mixture thereof. The surface treatment allows (i) a polar group on the surface of a fiber base material to be charged or (ii) a new polar group to be formed. Examples of the polar group include hydroxyl group, carbonyl group, carboxyl group, aldehyde group, phosphate group, urea group, sulfo group, nitro group, amide group, and cyano group. The surface treatment can thus improve the affinity between the ionic polymer and the fiber surface, and allows the ionic polymer to suitably cover the fiber surface. The surface treatment may be an aspect of a hydrophilization treatment.

Whether the fiber surface has been modified may be quantified on the basis of, for example, the absorbance or transmittance of the polar group such as hydroxyl group which absorbance or transmittance is measured by infrared spectroscopy (IR). Whether the fiber surface has been modified may be evaluated through, for example, measurement of the angle of contact with water surface, a wetting tension test, or X-ray photoelectron spectrometry.

Forming Base

A method for producing a composite fiber includes forming at least one layer of base for fixing inorganic particles to a fiber surface. The base is formed by immersing fiber as a base material into the above-described solution containing an ionic polymer or applying the fiber to the solution. In a case where, for instance, the fiber as a base material is a fiber (such as cellulose) that has a large number of hydroxyl groups and carboxyl groups on a surface and that tends to be negatively charged, the first layer of base preferably includes a cationic polymer. In a case where the fiber as a base material is a fiber having a surface that tends to be charged positively as a result of the fiber having been modified with, for example, a cationic polymer or having been acid-treated, the first layer of base preferably includes an anionic polymer.

The formation of base is carried out at least once. However, the formation of base is preferably carrying out a plurality of times in order for a larger amount of inorganic particles to be fixed. In a case where the base includes a plurality of layers, the plurality of layers may include two to seven layers of ionic polymer.

In a case where a plurality of layers are to be formed as a base, the plurality of layers are formed by (i) immersing fiber as a base material alternately into a solution containing a cationic polymer and a solution containing an anionic polymer or (ii) applying the fiber alternately to the solution containing a cationic polymer and the solution containing an anionic polymer (layer-by-layer method). In a case where a plurality of layers of ionic polymer are to be formed as a base, the fiber is preferably washed with water between (i) the step of immersing the fiber into the solution containing a cationic polymer or applying the fiber to the solution containing a cationic polymer and (ii) the step of immersing the fiber into the solution containing an anionic polymer or applying the fiber to the solution containing an anionic polymer. Such a washing treatment is referred to also as rinsing treatment. Through the rinsing treatment, in a case where, for instance, the fiber having been immersed into or applied to the solution containing a cationic polymer is to be immersed into or applied to the solution containing an anionic polymer, it is possible to prevent the cationic polymer adhering to the fiber from being mixed with the solution containing an anionic polymer. The rinsing treatment also allows the cationic polymer to be suitably fixed to the fiber before the fiber is immersed into or applied to the solution of an anionic polymer. The rinsing treatment may involve use of, for example, deionized water or distilled water as the water. The water may include, for example, a pH adjusting agent as long as the present invention is effective as intended.

In a case where the rinsing treatment is to be carried out, the rinsing treatment may be carried out as the next step before a layer containing a cationic polymer is dried or a layer containing an anionic polymer is dried during alternate deposition of the layer containing a cationic polymer and the layer containing an anionic polymer. In other words, in an aspect, the alternate deposition can be carried out by wet-on-wet method.

The application is carried out suitably with use of a device in typical use to apply a solution or dispersion to a sheet surface. Example devices include a spray coater, a curtain coater, a pound-type size press, a rod metering size press, and a gate roll coater.

Solution of Ionic Polymer

The solution of an ionic polymer is a solution of a cationic polymer or a solution of an anionic polymer. The solution of an ionic polymer is typically an aqueous solution of a cationic polymer or an anionic polymer. The amount of the ionic polymer contained in the aqueous solution is not limited to any particular value. No matter whether the solution of an ionic polymer is a solution of a cationic polymer or a solution of an anionic polymer, the monomeric unit of the polymer preferably has a concentration within a range of $1\times10^{-3}$ M to $5\times10^{-2}$ M. In a case where for the solution of an ionic polymer, the monomeric unit of the polymer has a concentration within the range of $1\times10^{-3}$ M to $5\times10^{-2}$ M, it is possible to suitably control how the polymer is deposited on the fiber surface.

The solution containing an ionic polymer has been adjusted according to the kind of the cationic polymer or anionic polymer to have a pH that allows the ionic polymer to be dissolved. The solution containing a cationic polymer may contain, for example, a plurality of kinds of cationic polymers. The solution containing an anionic polymer may similarly contain a plurality of kinds of anionic polymers. An alternative arrangement is such that a plurality of solutions containing respective anionic polymers different from each other are prepared, and the fiber is immersed alternately into or applied alternatively to one of those solutions and a solution containing a cationic polymer so that a base layer is formed that includes a plurality of kinds of anionic polymers. Similarly, an alternative arrangement is such that a plurality of solutions containing respective cationic polymers different from each other are prepared, and the fiber is immersed alternately into or applied alternatively to one of those solutions and a solution containing an anionic polymer so that a base layer is formed that includes a plurality of kinds of cationic polymers.

The solution of an ionic polymer may contain a pH adjusting agent and an anti-foaming agent, depending on the purpose. The ionic polymer used before and after inorganic particles are deposited preferably has an electric charge in the solution of the ionic polymer which electric charge is opposite in polarity to the surface electric charge of the inorganic particles.

Forming Layer of Inorganic Particles

A layer of inorganic particles is formed by at least once (i) immersing fiber on which a base has been formed into a dispersion containing inorganic particles or (ii) applying the fiber to the dispersion to cause the inorganic particles to be fixed to the base. A layer of inorganic particles is formed by at least once immersing fiber on which a base has been formed into a dispersion containing inorganic particles or applying the fiber to the dispersion. However, in order for inorganic particles to adhere to fiber in a larger amount, a layer of inorganic particles is formed preferably by a plurality of times (i) immersing fiber on which a base has been formed into a dispersion containing inorganic particles or (ii) applying the fiber to the dispersion. The layer of inorganic particles is formed by immersing fiber on which a base has been formed alternately into a dispersion containing inorganic particles and a solution containing an ionic polymer or applying the fiber alternately to the dispersion and the solution (layer-by-layer method). How a layer of inorganic particles is formed is not limited to any particular manner. It is preferable to, for instance, carry out 1 to 10 sets of operations each including (i) immersing the fiber into the dispersion containing inorganic particles or applying the fiber to the dispersion and (ii) immersing the fiber into the solution containing an ionic polymer or applying the fiber to the solution.

The solution containing an ionic polymer for use in forming a layer of inorganic particles can be similar to the solution containing an ionic polymer for use in forming a base on a fiber surface. The solution containing an ionic polymer is thus not described here.

Dispersion Containing Inorganic Particles

The dispersion containing inorganic particles is a dispersion in which inorganic particles are dispersed, and is typically an aqueous dispersion of inorganic particles. The dispersion contains inorganic particles at a concentration of preferably 0.005% to 1%, more preferably 0.01% to 0.5%. The dispersion containing inorganic particles at a concentration of 0.005% to 1% allows the inorganic particles to be suitably fixed to the layer of an ionic polymer by layer-by-layer method involving a solution containing an ionic polymer. The dispersion of inorganic particles may contain, for example, a publicly known additive such as a dispersing agent and a pH adjusting agent as long as the present invention is effective as intended.

The inorganic particles contained in the dispersion have an average primary particle diameter of preferably 1 nm to 50 μm, more preferably 10 nm to 30 μm, particularly preferably 20 nm to 10 μm. In particular, the inorganic particles can have an average primary particle diameter of not more than 3 μm. The inorganic particles may alternatively have an average primary particle diameter of not more than 1.5 μm, not more than 1 μm, not more than 800 nm, not more than 500 nm, not more than 200 nm, not more than 100 nm, or not more than 50 nm. The inorganic particles may also have an average primary particle diameter of not less than 10 nm. The average primary particle diameter can be calculated on the basis of an electron micrograph.

In an aspect of the present invention, the inorganic particles contained in the dispersion preferably have surfaces having an electric charge opposite in polarity to the electric charge of the ionic portion of the ionic polymer used to form a layer of inorganic particles. This arrangement allows the inorganic particles to be bound to each other firmly via the ionic polymer. The electric charge of the surfaces of the inorganic particles can be determined on the basis of the zeta potential. The electric potential of the surfaces of the inorganic particles is adjusted by adjusting the pH of the dispersion.

In an aspect, the dispersion containing inorganic particles can be prepared by a publicly known method. The dispersion of inorganic particles can be produced by, for example, a gas-liquid method or a liquid-liquid method. An example of the gas-liquid method is a carbon dioxide process, through which magnesium carbonate can be synthesized by causing, for example, magnesium hydroxide to react with carbonic acid gas. Calcium carbonate can be synthesized through a carbon dioxide process in which calcium hydroxide and carbonic acid gas are reacted with each other. Calcium carbonate may be synthesized by, for example, a soluble salt reaction method, a lime-soda method, or a soda method. Magnesium carbonate can be synthesized by a method of adding sodium carbonate or potassium carbonate to an aqueous magnesium salt solution. Examples of the liquid-liquid method include (i) a method in which an acid (such as hydrochloric acid or sulfuric acid) is caused to react with a base (such as sodium hydroxide or potassium hydroxide) by neutralization, (ii) a method in which an inorganic salt is caused to react with an acid or a base, and (iii) a method in which inorganic salts are caused to react with each other. Barium sulfate can be produced by, for example, causing barium hydroxide to react with sulfuric acid. Causing barium hydroxide to react with aluminum sulfate can produce not only barium sulfate but also an aluminum compound such as aluminum hydroxide. Aluminum hydroxide can be produced by causing aluminum chloride or aluminum sulfate to react with sodium hydroxide. Inorganic particles in which calcium and aluminum are complexed can be produced by causing calcium carbonate to react with aluminum sulfate. In synthesizing inorganic particles in this manner, metals or metal compounds can coexist in a reaction liquid. In such a case, the metals or metal compounds can be efficiently incorporated into and complexed with the inorganic particles. For example, in a case where phosphoric acid is added to calcium carbonate to synthesize calcium phosphate, composite particles of calcium phosphate and titanium can be obtained by causing titanium dioxide to coexist in the reaction liquid.

In a case where two or more types of inorganic particles are complexed with fiber, it is possible that synthetic reaction of one type of inorganic particles is carried out in the presence of the fiber, then the synthetic reaction is halted, and then another synthetic reaction of the other type of inorganic particles is carried out. Two or more types of inorganic particles can be simultaneously synthesized, provided that those types of inorganic particles do not obstruct each other's reactions, or two or more types of intended inorganic particles are synthesized by one reaction.

Molded Article

An inorganic particle composite fiber is suitably usable as a molding material for producing a molded article such as a sheet. An inorganic particle composite fiber includes inorganic particles fixed to the fiber surface in an unmolded state. As compared to, for example, a fiber material including inorganic particles fixed to the surface of a sheet-shaped molded article, a molded article formed of an inorganic particle composite fiber in accordance with an aspect does not include inorganic particles concentrated on the surface of the molded article, and is thus a molded article including inorganic particles fixed inside the molded article as well. Thus, a molded article formed of an inorganic particle composite fiber in accordance with an aspect is also within the scope of the present invention.

Aspects of the present invention can also be expressed as follows:

The present invention encompasses, but is not limited to, the following features:

(1) An inorganic particle composite fiber, including: fiber; and inorganic particles fixed to the fiber, the fiber being thread-like in shape, the inorganic particles being fixed to the fiber via an ionic polymer.

(2) The inorganic particle composite fiber according to (1), wherein the inorganic particles are bound to each other via the ionic polymer in such a manner as to form a layer containing the inorganic particles.

(3) The inorganic particle composite fiber according to (1) or (2), wherein the ionic polymer has an electric charge opposite in polarity to an electric charge of the inorganic particles.

(4) The inorganic particle composite fiber according to (1) or (2), wherein the ionic polymer is an anionic polymer having a chelating ability.

(5) The inorganic particle composite fiber according to any one of (1) to (4), wherein the inorganic particle composite fiber includes a plurality of layers each containing the ionic polymer which is present between the fiber and the inorganic particles, and the plurality of layers are a stack of a layer containing a cationic polymer and a layer containing an anionic polymer.

(6) The inorganic particle composite fiber according to any one of (1) to (5), wherein the fiber has a surface on which a polar group is present.

(7) A method for producing an inorganic particle composite fiber according to any one of (1) to (6), the method including: fixing the inorganic particles to the fiber by (i) immersing the fiber into a solution containing the ionic polymer or applying the fiber to the solution containing the ionic polymer; and subsequently (ii) immersing the fiber into a dispersion containing the inorganic particles or applying the fiber to the dispersion containing the inorganic particles.

(8) A method for producing an inorganic particle composite fiber according to (2), the method including: forming the layer containing the inorganic particles by (i) immersing the fiber alternately into a solution containing the ionic polymer or a dispersion containing the inorganic particles or (ii) applying the fiber alternately to the solution containing the ionic polymer or the dispersion containing the inorganic particles.

(9) A method for producing an inorganic particle composite fiber according to (5), the method including: forming the plurality of layers by, before forming a layer containing the inorganic particles, (i) immersing the fiber into a solution containing a cationic polymer as a solution containing the ionic polymer and into a solution containing an anionic polymer as the solution containing the ionic polymer or (ii) applying the fiber to the solution containing the cationic polymer as the solution containing the ionic polymer and to the solution containing the anionic polymer as the solution containing the ionic polymer.

(10) The inorganic particle composite fiber according to any one of (1) to (6), wherein cellulose fiber has a surface not less than 15% of which is covered with the inorganic particles.

(11) The inorganic particle composite fiber according to any one of (1) to (6) and (10), wherein the inorganic particles have an average primary particle diameter of not more than 3 μm.

(12) The inorganic particle composite fiber according to any one of (1) to (6), (10), and (11), wherein the inorganic particles at least partially contain calcium, silicic acid, magnesium, barium, aluminum, titanium, copper, silver, zinc, platinum, iron, palladium, or zirconium.

(13) The inorganic particle composite fiber according to any one of (1) to (6) and (10) to (12), wherein the fiber is a chemical fiber.

(14) The method according to any one of (7) to (9), further including: before immersing the fiber into the solution containing the ionic polymer, treating the fiber so that the fiber has a surface on which a polar group is present.

(15) A molded article produced by molding an inorganic particle composite fiber according to any one of (1) to (6) and (10) to (13).

EXAMPLES

The present invention will be described below in more detail with reference to Examples. Note, however, that the present invention is not limited to such Examples. In addition, unless otherwise specified in this specification, concentrations, parts, and the like are based on the weight, and numerical ranges are described as including endpoints thereof.

Synthesizing Inorganic Particle Composite Fiber of Inorganic Particles and Chemical Fiber Inorganic particles were fixed to the surface of chemical fiber by layer-by-layer (LbL) method. The following shows the fiber and the dispersion of inorganic particles both used for each sample.
Chemical fiber
Lyocell (available from LENZING, with an average fiber length of 4 mm)
Dispersion of inorganic particles
Dispersion of calcium carbonate (with an average particle diameter of 90 nm, 0.1% aqueous solution, pH 7.5)
Dispersion of magnesium carbonate (with an average particle diameter of 1.5 μm, 0.1% aqueous solution, pH 9.0)

The dispersion of inorganic particles was produced by causing cavitation bubbles to be generated in a reactor vessel by circulating a reaction solution and injecting the reaction solution into the reactor vessel as shown in FIG. 1. Specifically, the dispersion of inorganic particles was produced by causing cavitation bubbles to be generated by injecting the reaction solution at a high pressure through a nozzle (nozzle diameter: 1.5 mm).

To produce the dispersion of calcium carbonate, 9.5 L of an aqueous suspension (2%) of hydrated lime (calcium hydroxide: $Ca(OH)_2$) was put into a 45-L pressure device, and carbonic acid gas was blown into the suspension to synthesize calcium carbonate particles (carbon dioxide process). The reaction temperature was approximately 25° C. Carbonic acid gas with a purity of 100% was blown into the aqueous suspension of hydrated lime at a blowing rate of 3 L/min. The reaction was stopped when the pH of the aqueous suspension reached approximately 7. Before the reaction, the aqueous suspension of hydrated lime had a pH of approximately 12.8. In synthesizing an inorganic particle, the reaction was carried out by circulating a reaction solution and injecting the reaction solution into a reactor vessel as shown in FIG. 1. Specifically, calcium carbonate particles were synthesized at a jet velocity of approximately 70 m/s under an inlet pressure (upstream pressure) of 3 MPa and an outlet pressure (downstream pressure) of 0.3 MPa. The above-produced dispersion of calcium carbonate was filtered through a 325-mesh sieve.

To produce the dispersion of magnesium carbonate, an aqueous suspension (14 L) containing 140 g of magnesium hydroxide (Wako Pure Chemical Industries, Ltd.) was prepared, the aqueous suspension was put into a 45-L cavitation device, and carbonic acid gas was blown into the suspension to synthesize fine magnesium carbonate particles (carbon dioxide process). The reaction temperature was approximately 36° C. The carbonic acid gas was supplied from a commercially available liquefied gas. The carbonic acid gas was blown at a blowing rate of 4 L/min. The reaction was stopped when the pH of the aqueous suspension reached approximately 8. For 30 minutes thereafter, generation of cavitation and circulation of slurry within the device continued to produce basic magnesium carbonate. Before the reaction, the suspension of magnesium hydroxide had a pH of approximately 9.5. Fine magnesium carbonate particles were synthesized at a reaction solution jet velocity of approximately 70 m/s under an inlet pressure (upstream pressure) of 7 MPa and an outlet pressure (downstream pressure) of 0.3 MPa.

The respective zeta potentials of the calcium carbonate and the magnesium carbonate both produced as above were measured. The calcium carbonate had a zeta potential of −5 mV. The magnesium carbonate had a zeta potential of −15 mV. Both the calcium carbonate and the magnesium carbonate were anionic.

Table 1 below shows the reagents (solutions) used for each sample.

(2) Alternate Deposition of Each Polymer and Inorganic Particles

The fiber having been subjected to the UV ozone treatment was immersed in a polymer solution and a dispersion, and was subjected to a rinsing treatment.

A reagent shown in Table 1, the above dispersion of inorganic particles, and distilled water were separately put into a 1-L polyethylene cup in a combined amount of approximately 200 mL. Next, the fiber having been subjected to the UV-ozone treatment was placed on a sieve (made of stainless steel), and the sieve was immersed into the reagent (or dispersion) in the polyethylene cup for an immersion treatment. Through the same procedure, the fiber having been immersed into the reagent was washed with distilled water for a rinsing treatment. The immersion treatment and the rinsing treatment were each carried out through a procedure described below.

Immersion Treatment

The fiber was immersed into a reagent shown in Table 1 or the above dispersion of inorganic particles. Regardless of the reagent, the fiber was immersed once for 120 seconds. In a case where the fiber was immersed into the dispersion of

TABLE 1

| Reagent (abbreviation) | Reagent company | Molecular weight | Structure | Solution concentration |
|---|---|---|---|---|
| Cationic polymer: Aqueous polyethylene imine solution (PEI solution) | BASF | 750000 | [structure] | 0.43 g/L *$10^{-2}$M (per repeat unit) |
| Anionic polymer: Aqueous polystyrene sulfonate sodium salt solution (PSS solution) | Kanto Chemical Co., Inc. | 70000 | [structure] | 2.06 g/L *$10^{-2}$M (per repeat unit) |
| Anionic polymer: Aqueous polyacrylic acid sodium salt solution (PAA solution) | Wako Pure Chemical Industries, Ltd. | 25000 | [structure] | 0.72 g/L *$10^{-2}$M (per repeat unit) |

(1) Surface Treatment

First, 0.1 g of lyocell was disentangled, spread out across substantially the entire surface of drug packing paper, and subjected to a UV-ozone treatment for 3 minutes with use of a UV—$O_3$ cleaner (available from Bioforce nanosciences).

inorganic particles, the fiber was immersed under the same conditions except that the reagent was replaced with the dispersion.

Rinsing Treatment

In preparing samples 1 to 7 below, the fiber having been immersed into a reagent (or dispersion) was subjected to a rinsing treatment before a subsequent immersion treatment. The rinsing treatment between immersion treatments was carried out twice. Each rinsing treatment lasted for 60 seconds. Each sample was, after the last immersion treatment, further subjected to a rinsing treatment under the same conditions.

Sample 1

For sample 1, fiber was subjected to a UV ozone treatment, immersed into a PEI solution, and then immersed into a PSS solution to form a total of five base layers of PEI and PSS. Subsequently, the fiber on which the base layers had been formed was immersed into a dispersion of magnesium carbonate and then immersed into a PEI solution. The immersion into the dispersion of magnesium carbonate and into the PEI solution was carried out a total of three times. This formed a layer of magnesium carbonate.

Sample 2

For sample 2, fiber was subjected to a UV ozone treatment and immersed into a PEI solution to form a total of one base layer. Subsequently, the fiber on which the base layers had been formed was immersed into a dispersion of magnesium carbonate and then immersed into a PEI solution. The immersion into the dispersion of magnesium carbonate and into the PEI solution was carried out a total of three times. This formed a layer of magnesium carbonate.

Sample 3

For sample 3, fiber was subjected to a UV ozone treatment, immersed into a PEI solution, and then immersed into a PSS solution to form a total of two base layers. Subsequently, the fiber on which the base layers had been formed was immersed into a dispersion of magnesium carbonate and then immersed into a PEI solution. The immersion into the dispersion of magnesium carbonate and into the PEI solution was carried out a total of three times. This formed a layer of magnesium carbonate. Next, the fiber on which the layer of magnesium carbonate had been formed was immersed into a PEI solution to form a PEI layer.

Sample 4

Sample 4 was prepared under the same conditions as those for Sample 1 except that the dispersion of magnesium carbonate was replaced with a dispersion of calcium carbonate.

Sample 5

Sample 5 was prepared under the same conditions as those for Sample 2 except that the dispersion of magnesium carbonate was replaced with a dispersion of calcium carbonate.

Sample 6

Sample 6 was prepared under the same conditions as those for Sample 3 except that the dispersion of magnesium carbonate was replaced with a dispersion of calcium carbonate.

Sample 7

For sample 7, fiber was subjected to a UV ozone treatment, immersed into a PEI solution, and then immersed into a PSS solution to form five layers of PEI and PSS. The fiber was further immersed into a PAA solution to form a total of six base layers. Subsequently, the fiber on which the base layers had been formed was immersed into a PEI solution, a dispersion of calcium carbonate, and then immersed into a PAA solution. This formed a layer of magnesium carbonate. Next, the fiber on which the layer of magnesium carbonate had been formed was immersed into a PEI solution to form a PEI layer.

Sample 8

Sample 8 was prepared under the same conditions as those for Sample 1 except that a UV ozone treatment was not carried out for the experiment.

Table 2 below shows the procedure of how the composite fiber as each of samples 1 to 7 was prepared.

TABLE 2

| | Times of immersion | Samples 1 and 8 | Sample 2 | Sample 3 | Sample 4 | Sample 5 | Sample 6 | Sample 7 |
|---|---|---|---|---|---|---|---|---|
| Base | First | PEI | PEI | PEI | PEI | PEI | PEI | PEI |
| | Second | PSS | — | PAA | PSS | — | PAA | PSS |
| | Third | PEI | — | — | PEI | — | — | PEI |
| | Fourth | PSS | — | — | PSS | — | — | PSS |
| | Fifth | PEI | — | — | PEI | — | — | PEI |
| | Sixth | — | — | — | — | — | — | PAA |
| Layer of inorganic particles | First | $MgCO_3$ PEI | $MgCO_3$ PEI | $MgCO_3$ PAA | $CaCO_3$ PEI | $CaCO_3$ PEI | $CaCO_3$ PAA | $CaCO_3$ PAA |
| | Second | $MgCO_3$ PEI | $MgCO_3$ PEI | $MgCO_3$ PAA | $CaCO_3$ PEI | $CaCO_3$ PEI | $CaCO_3$ PAA | $CaCO_3$ PAA |
| | Third | $MgCO_3$ PEI — | $MgCO_3$ PEI — | $MgCO_3$ PAA PEI | $CaCO_3$ PEI — | $CaCO_3$ PEI — | $CaCO_3$ PAA PEI | $CaCO_3$ PAA PEI |

(3) SEM Observation

Figure 9:
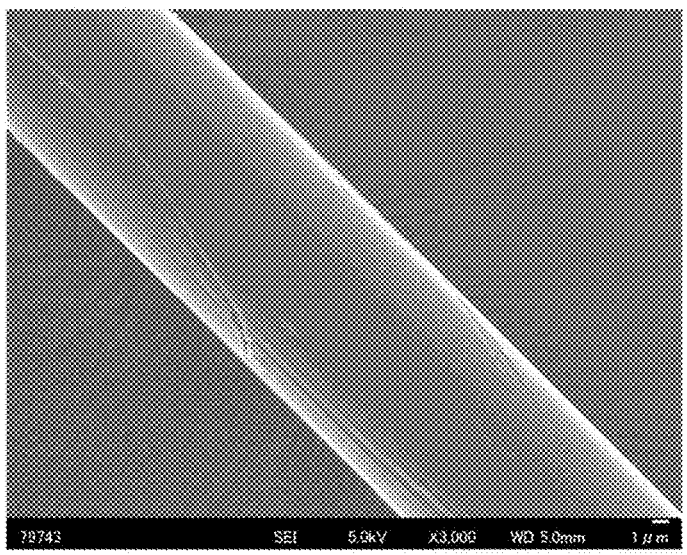
FIG. 9 is an electron micrograph of untreated lyocell.

For each of samples 1 to 7, the fiber having been immersed into a dispersion of inorganic particles was observed under a field-emission scanning electron microscope (FE-SEM) for each immersion treatment. FIGS. 2 to 9 show FE-SEM images with a magnification of 3000. FIG. 9 shows an image captured of untreated lyocell.

Figure 2:
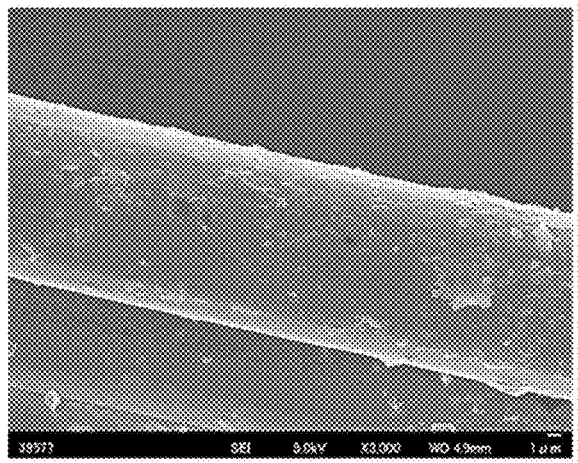
FIG. 2 provides respective electron micrographs of samples 1 to 3 each having been immersed once in a dispersion of magnesium carbonate (upper: sample 1, lower left: sample 2, and lower right: sample 3).
Figure 2:
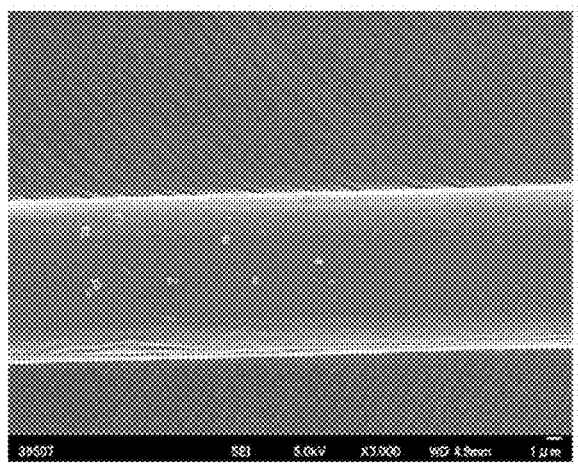
Figure 2:
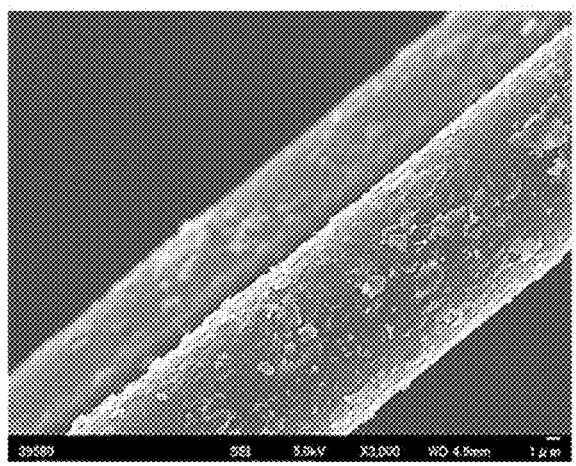
Figure 3:
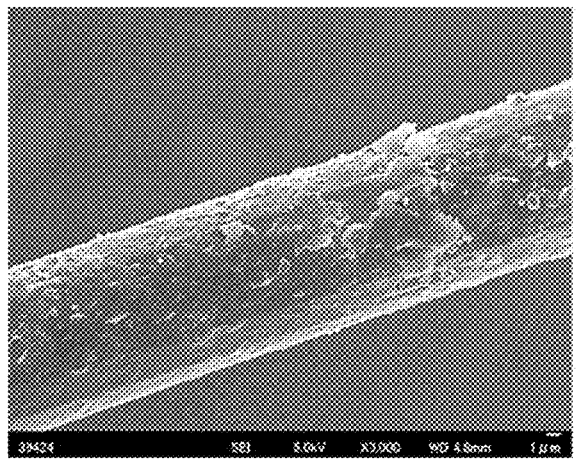
FIG. 3 provides respective electron micrographs of samples 1 to 3 each having been immersed twice in a dispersion of magnesium carbonate (upper: sample 1, lower left: sample 2, and lower right: sample 3).
Figure 3:
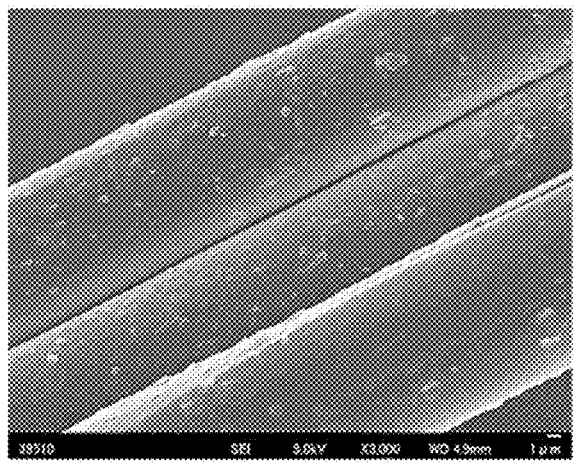
Figure 3:
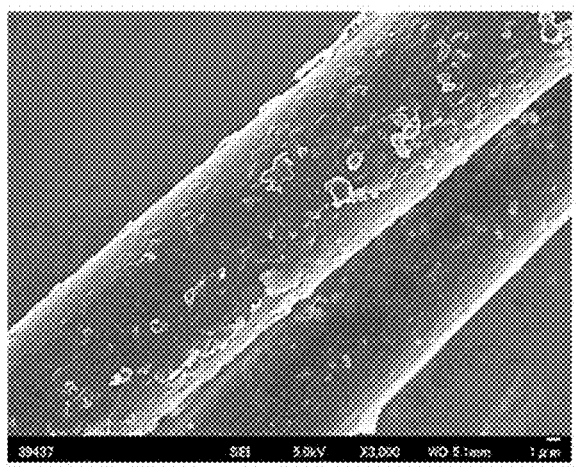
Figure 4:
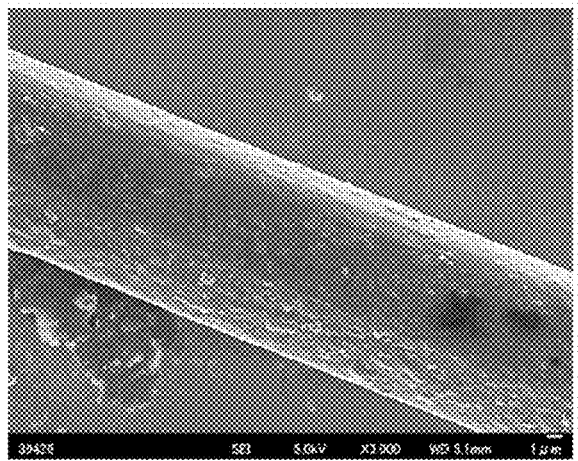
FIG. 4 provides respective electron micrographs of samples 1 to 3 each having been immersed three times in a dispersion of magnesium carbonate (upper: sample 1, lower left: sample 2, and lower right: sample 3).
Figure 4:
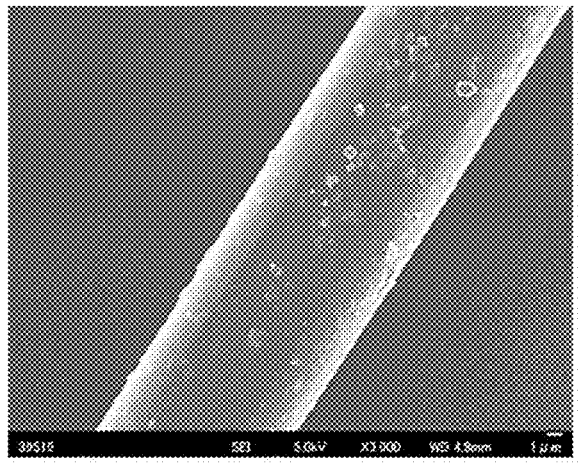
Figure 4:
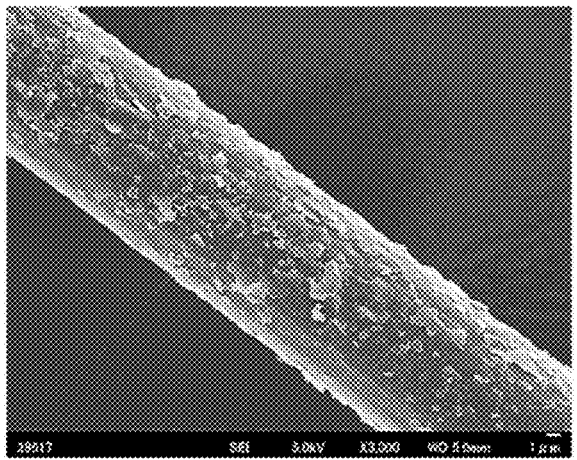

A comparison between the upper image (sample 1) and lower left image (sample 2) of each of FIGS. 2 to 4 shows that at any of the first to third immersion treatments, sample 1 (which included five base layers) tended to include adhering magnesium carbonate in an amount larger than the amount of magnesium carbonate of sample 2 (which included a single base layer). A comparison between the lower left image (sample 1) and lower right image (sample 3) of each of FIGS. 2 to 4 shows that at any of the first to third immersion treatments, sample 3 tended to include adhering magnesium carbonate in an larger amount.

Figure 5:
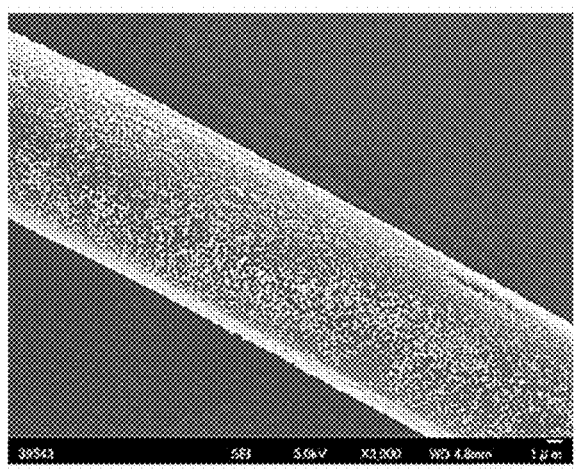
FIG. 5 provides respective electron micrographs of samples 4 to 7 each having been immersed once in a dispersion of calcium carbonate (upper left: sample 4, lower left: sample 5, lower right: sample 6, and upper left: sample 7).
Figure 5:
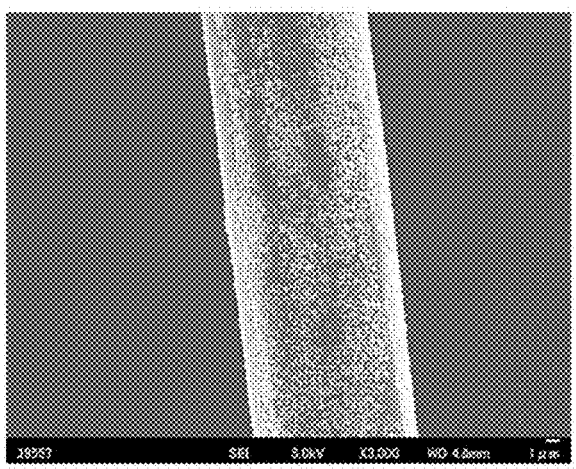
Figure 5:
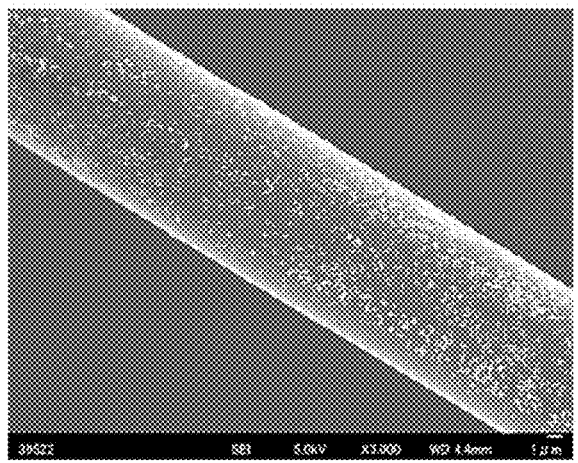
Figure 5:
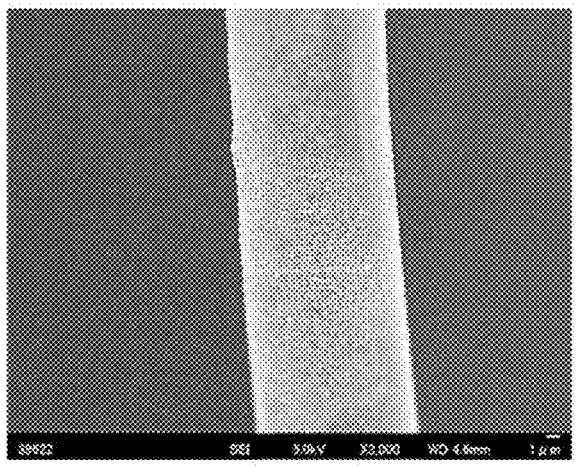
Figure 6:
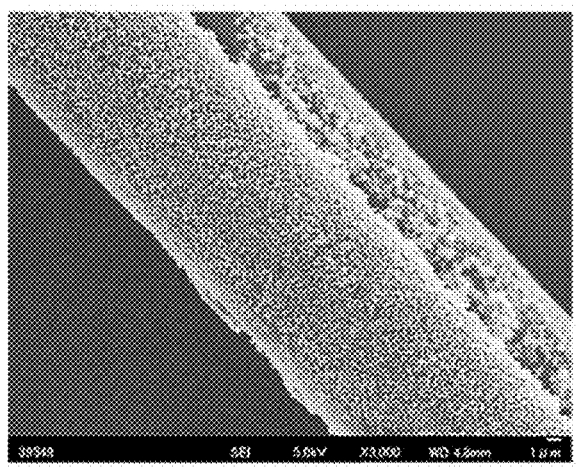
FIG. 6 provides respective electron micrographs of samples 4 to 7 each having been immersed twice in a dispersion of calcium carbonate (upper left: sample 4, lower left: sample 5, lower right: sample 6, and upper left: sample 7).
Figure 6:
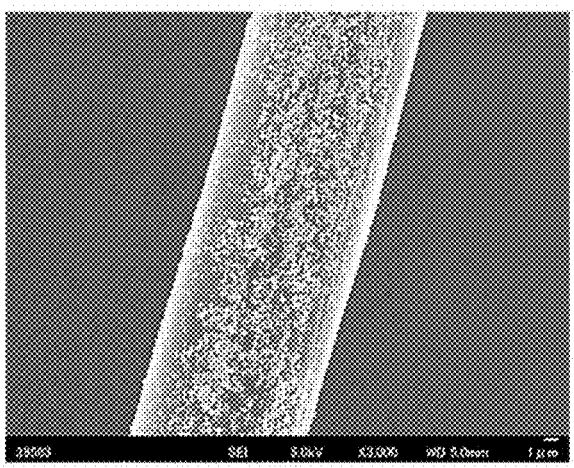
Figure 6:
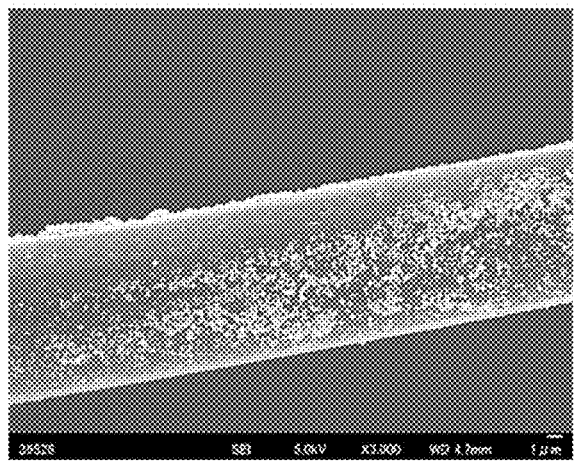
Figure 6:
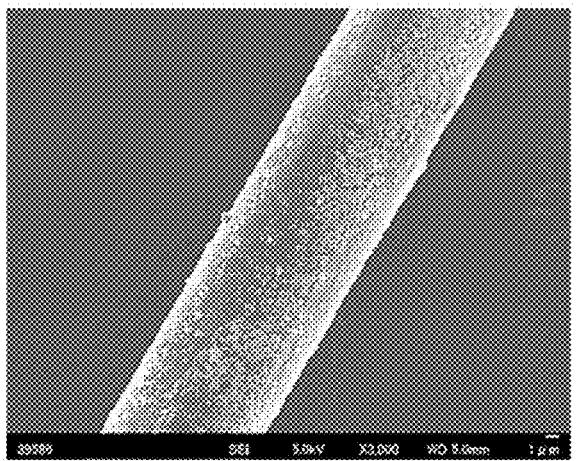
Figure 7:
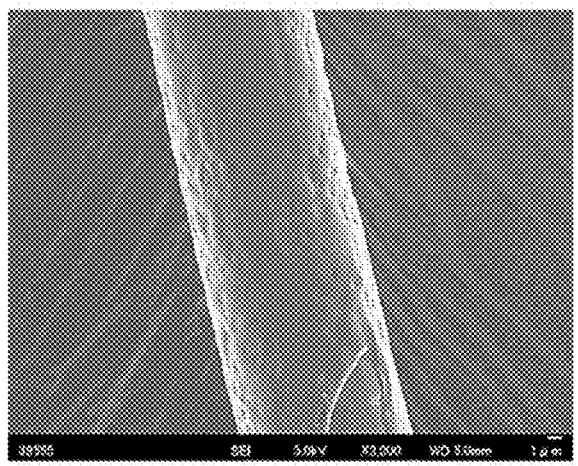
FIG. 7 provides respective electron micrographs of samples 4 to 7 each having been immersed three times in a dispersion of calcium carbonate (upper left: sample 4, lower left: sample 5, lower right: sample 6, and upper left: sample 7).
Figure 7:
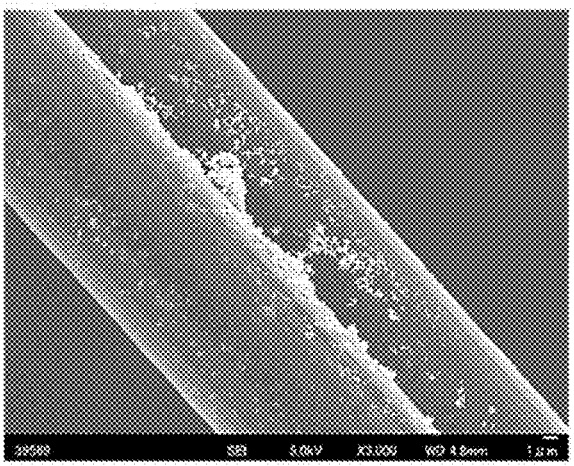
Figure 7:
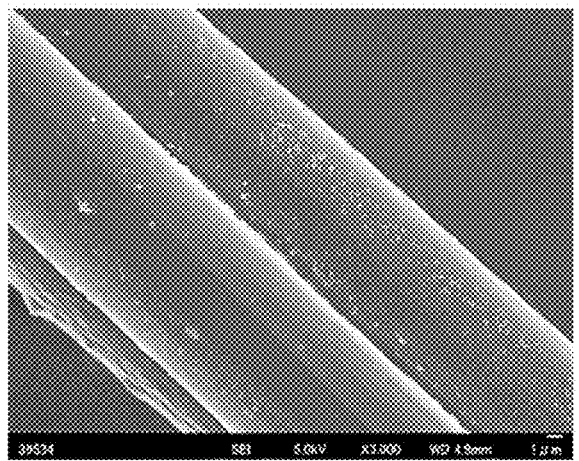
Figure 7:
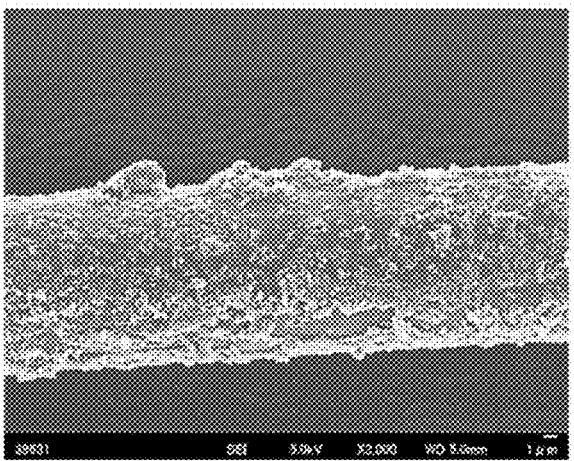
Figure 8:
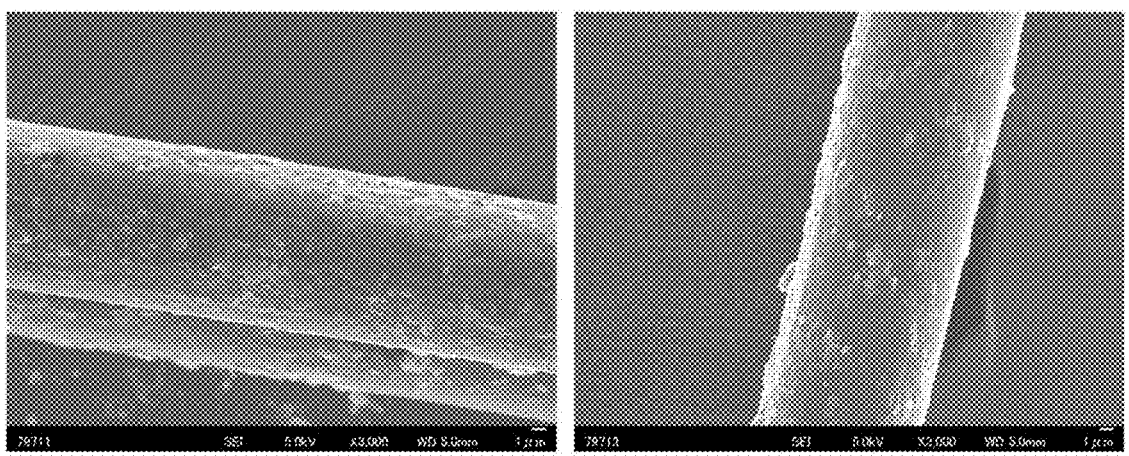
FIG. 8 provides electron micrographs of sample 8 having been immersed in a dispersion of magnesium carbonate (upper left: immersed once, upper right: immersed twice, and lower right: immersed three times).
Figure 8:
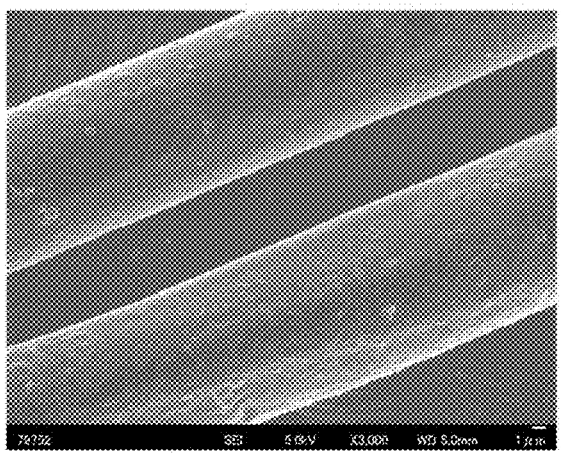

A comparison between the upper left image (sample 4) and lower left image (sample 5) of each of FIGS. 5 to 7 shows that at any of the first to third immersion treatments, sample 4 (which included five base layers) tended to include adhering calcium carbonate in an amount larger than the amount of calcium carbonate of sample 5 (which included a single base layer). In contrast, a comparison between the lower right image (sample 6) and upper right image (sample 7) of each of FIGS. 5 to 7 shows that samples 6 and 7 each tended to include adhering calcium carbonate in a large amount regardless of whether the sample included multiple base layers.

A comparison between the upper left and lower left images (samples 4 and 5) and upper right and lower right images (samples 6 and 7) of each of FIGS. 5 to 7 shows that samples 6 and 7 each tended to include inorganic particles in a layer thicker than the layer of inorganic particles of each of samples 4 and 5, but tended to include a non-uniform layer of inorganic particles.

A comparison between the upper left image (sample 1) in each of FIGS. 2 to 4 and FIG. 8 (sample 8) shows that in a case where lyocell was used as the fiber, each sample included magnesium carbonate covering the fiber surface, regardless of whether the sample was subjected to a pretreatment involving UV-ozone irradiation.

For each of samples 1 to 8, the fiber surface was covered with inorganic particles at a coverage of not less than 15% in a case where two or three layers of magnesium carbonate or calcium carbonate had been deposited.

INDUSTRIAL APPLICABILITY

An aspect of the present invention is suitably applicable to any of various fields involving use of fiber to which a function of inorganic particles has been imparted (for example, flame retardance, deodorant/antibacterial property, and radiation shielding property).

The invention claimed is:
1. An inorganic particle composite fiber, comprising:
fiber; and
inorganic particles fixed to the fiber,
the fiber being thread-like in shape,
the inorganic particles being fixed to the fiber via an ionic polymer,
the inorganic particle composite fiber including a plurality of layers each containing a portion of the ionic polymer which portion is present between the fiber and the inorganic particles,
the plurality of layers being a stack of a layer containing a cationic polymer and a layer containing an anionic polymer,
the fiber being selected from a regenerated fiber, a semi-synthetic, and a synthetic fiber, and
the fiber having a surface not less than 15% of which is covered with the inorganic particles,
wherein the synthetic fiber is at least one selected from a group of the synthetic fibers consisting of a polyester, a polyamide, a polyolefin, polyurethane fiber, acrylic fiber, vinylon, vinylidene, polyvinyl chloride, glass fiber, and metal fiber.
2. The inorganic particle composite fiber according to claim 1, wherein
the inorganic particles are bound to each other via the ionic polymer in such a manner as to form a layer containing the inorganic particles.
3. The inorganic particle composite fiber according to claim 1, wherein
the ionic polymer has an electric charge opposite in polarity to an electric charge of the inorganic particles.
4. The inorganic particle composite fiber according to claim 1, wherein
the ionic polymer is an anionic polymer or copolymer selected from a polymer or copolymer comprising an unsaturated carboxylic acid(s) and a polymer or copolymer comprising an unsaturated sulfonic acid(s).
5. The inorganic particle composite fiber according to claim 1, wherein
the fiber has a surface on which a polar group is present.
6. The inorganic particle composite fiber according to claim 1, wherein
the inorganic particles have an average primary particle diameter of not more than 3 µm.
7. The inorganic particle composite fiber according to claim 1, wherein
the inorganic particles at least partially contain calcium, silicic acid, magnesium, barium, aluminum, titanium, copper, silver, zinc, platinum, iron, palladium, or zirconium.
8. The inorganic particle composite fiber according to claim 1,
wherein the inorganic particles are contained in a plurality of layers that are a stack of a layer containing inorganic particles and a layer containing an ionic polymer.
9. A method for producing an inorganic particle composite fiber according to claim 1, the method comprising:
fixing the inorganic particles to the fiber by (i) immersing the fiber into a solution containing the ionic polymer or applying the fiber to the solution containing the ionic polymer; and
subsequently (ii) immersing the fiber into a dispersion containing the inorganic particles or applying the fiber to the dispersion containing the inorganic particles.
10. The method according to claim 5, further comprising:
before immersing the fiber into the solution containing the ionic polymer, treating the fiber so that the fiber has a surface on which a polar group is present.
11. A method for producing an inorganic particle composite fiber recited in claim 1, wherein
the inorganic particles are bound to each other via the ionic polymer in such a manner as to form a layer containing the inorganic particles,
the method comprising:
forming the layer containing the inorganic particles by (i) immersing the fiber alternately into a solution containing the ionic polymer or a dispersion containing the inorganic particles or (ii) applying the fiber alternately to the solution containing the ionic polymer or the dispersion containing the inorganic particles.
12. A method for producing an inorganic particle composite fiber according to claim 1, the method comprising:
forming the plurality of layers by, before forming a layer containing the inorganic particles, (i) immersing the fiber into a solution containing a cationic polymer as a solution containing the ionic polymer and into a solution containing an anionic polymer as the solution containing the ionic polymer or (ii) applying the fiber to the solution containing the cationic polymer as the solution containing the ionic polymer and to the solu- tion containing the anionic polymer as the solution containing the ionic polymer.

13. A molded article produced by molding an inorganic particle composite fiber according to claim 1.

* * * * *